United States Patent
Yano et al.

(10) Patent No.: US 8,963,493 B2
(45) Date of Patent: Feb. 24, 2015

(54) CHARGING CONTROL SYSTEM

(75) Inventors: Hitoshi Yano, Tokyo (JP); Koji Kudo, Tokyo (JP); Hiroto Iguchi, Tokyo (JP); Kazuhiko Ogimoto, Tokyo (JP); Kazuto Kataoka, Tokyo (JP); Takashi Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 382 days.

(21) Appl. No.: 13/393,816

(22) PCT Filed: Nov. 25, 2011

(86) PCT No.: PCT/JP2011/077172
§ 371 (c)(1),
(2), (4) Date: Mar. 1, 2012

(87) PCT Pub. No.: WO2012/120736
PCT Pub. Date: Sep. 13, 2012

(65) Prior Publication Data
US 2013/0134934 A1    May 30, 2013

(30) Foreign Application Priority Data

Mar. 4, 2011  (JP) ................. 2011-047761
Aug. 10, 2011 (JP) ................. 2011-174892

(51) Int. Cl.
*H02J 7/00* (2006.01)
(52) U.S. Cl.
USPC ........................................... 320/109
(58) Field of Classification Search
CPC ... Y02T 90/14; Y02T 10/7005; Y02T 90/128; Y02T 10/7088; Y02T 90/163
USPC ......................................................... 320/109
See application file for complete search history.

(56) References Cited

U.S. PATENT DOCUMENTS

| | | | |
|---|---|---|---|
| 2009/0062967 A1* | 3/2009 | Kressner et al. | 700/286 |
| 2010/0076825 A1 | 3/2010 | Sato et al. | |
| 2010/0082277 A1 | 4/2010 | Ballard | |
| 2010/0217485 A1 | 8/2010 | Ichishi | |
| 2012/0249065 A1* | 10/2012 | Bissonette et al. | 320/109 |

FOREIGN PATENT DOCUMENTS

| | | |
|---|---|---|
| EP | 2 219 278 A1 | 8/2010 |
| JP | 2009-136109 A | 6/2009 |
| JP | 2009-296705 A | 12/2009 |

(Continued)

OTHER PUBLICATIONS

Ota et al., "Proposal of Smart Storage in Ubiquitous Power Network—Autonomous Distributed type Vehicle-to-Grid for Electric Vehicles", Journal of Institute of Electrical Engineers B, vol. 130, No. 11, pp. 989 to 994 (2010).

(Continued)

*Primary Examiner* — Arun Williams
(74) *Attorney, Agent, or Firm* — McGinn IP Law Group, PLLC

(57) ABSTRACT

A charging controller (300) controls charging of a battery by an interface device (400-1 to 400-*m*) on the basis of distribution system connection time when the interface device (400-1 to 400-*m*) and a battery mounted on EV (500-1 to 500-*n*) are connected to each other and on the basis of distribution system disconnection time when they are disconnected in each of the interface devices (400-1 to 400-*m*).

11 Claims, 20 Drawing Sheets

(56) References Cited

FOREIGN PATENT DOCUMENTS

| | | |
|---|---|---|
| JP | 2010-81722 A | 4/2010 |
| JP | 2010-512727 A | 4/2010 |
| JP | 2010-110173 A | 5/2010 |
| JP | 2011-15521 A | 1/2011 |
| JP | 2011-239662 A | 11/2011 |
| WO | WO 2008/073453 A1 | 6/2008 |

OTHER PUBLICATIONS

Ota et al., "Effect with respect to Frequency Control of Smart Storage in Ubiquitous Power Network", Journal of Institute of Electrical Engineers B, vol. 131, No. 1, pp. 94 to 100 (2011).
European Search Report dated Sep. 18, 2014.

* cited by examiner

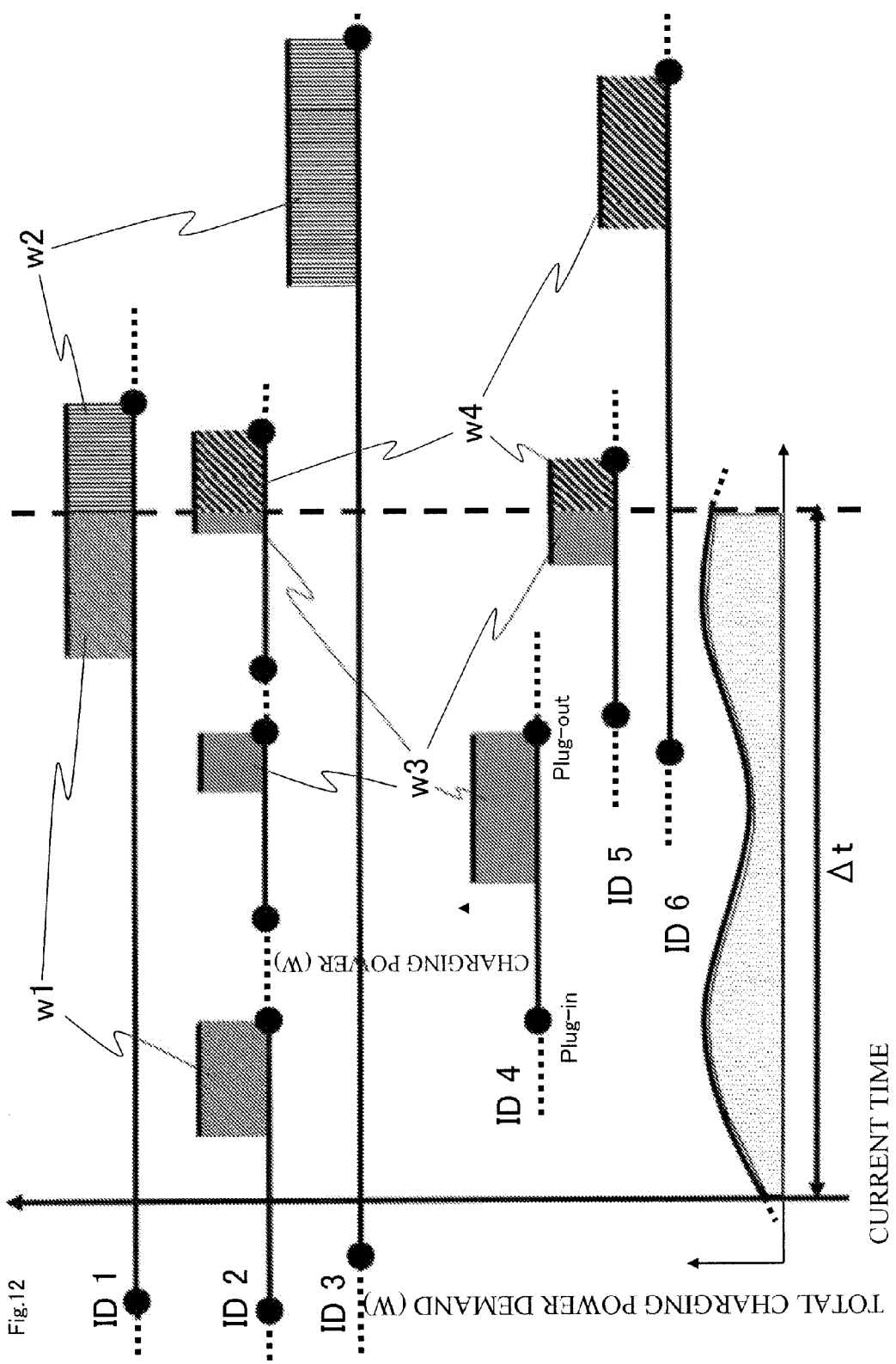

CHARGING CONTROL SYSTEM

TECHNICAL FIELD

The present invention relates to a charging control system which charges a battery, a charging controller, and a charging control method and particularly a charging control system which charges a battery mounted on an automobile, a charging controller, and a charging control method.

BACKGROUND ART

Recently, to cope with environmental problems or restrain fossil energy for preventing an-increase in production of petroleum, power sources for automobiles have been reviewed. For example, an electric vehicle (hereinafter referred to as an EV) which does not use petroleum or emit $CO_2$ and a plug-in hybrid electric vehicle (hereinafter referred to as a PHEV) in which an electric motor is combined with an internal combustion engine and the emission of $CO_2$ is drastically reduced have spread.

Several hundred thousand to several million EVs or PHEVs are expected to spread in the future. In that case, the amount of energy that is needed to charge batteries, which are power sources for EVs, will create a huge demand for electrical power, which will possibly affect stable control of the supply-demand balance of a power system which has been used so far.

On the other hand, in order to solve the environmental problems, that is, in order to realize a low-oxygen society, large-scale introduction of renewable power sources such as solar power generation, wind power generation and the like is indispensable. However, power supply of the renewable power sources in which there is large temporal fluctuation also has a great impact on stable control of the supply-demand balance of the power system.

FIG. 1 is a diagram illustrating an example of a relationship between supply power and demand power (power that is demanded) in one day.

As illustrated in FIG. 1, the relationship between the supply power and the demand power from 0 O'clock to 24 O'clock changes over time.

It is difficult to change the base supply power output thereof (adjustability with respect to power fluctuation is small) but the base supply power can generate electric power inexpensively, and this type of power supply can be increased if demand for power increases due to spread of EVs and PHEVs.

The demand power is consumed by consumers such as general households and businesses and fluctuates depending on the condition such as seasons, weekdays and weekends. Since the demand is involved in human activities, it has a cyclic nature of 24 hours, in which demand is high during daytime and tends to fall during nighttime. The portion of a balance by which the demand power falls below the base supply power during nighttime, when the demand power is small, becomes nighttime surplus power. In order not to waste this nighttime surplus power, various methods have been examined. For example, such methods include a method in which pumped storage hydro is used during the nighttime to pump and store water as potential energy, a method in which nighttime power charges are lowered so that consumers can accumulate the power as heat in equipment such as a heat pump and can use the heat (hot water, for example) during daytime, and a method of time-shift of demand in which dedicated batteries are prepared and surplus is charged, and the charging power is discharged when power is not sufficient and the like.

Moreover, as illustrated in FIG. 1, during daytime, photovoltaic power generation becomes large, and the sum of the generated power of the base power source and the generated power of the solar power source exceeds the demand power. That is, the excess power also becomes a surplus similarly to the nighttime surplus power. This surplus power can also be effectively used without discarding generated power by means of well-designed time-shift of demand similar to the nighttime surplus power.

In general, without power generated by solar power source, thermal power generation whose output can be easily varied and the like are used for meeting the demand in a time zone when the demand power exceeds the power generated by the base power source.

Moreover, methods of accumulating surplus power include, other than a method of accumulation through conversion to mechanical energy, such as the above-described pumped-storage power generation, a method of accumulating power in a battery. Practical applications have been found for large sized batteries, such as NAS, for example, and the way in which these batteries are used is technically feasible, but the investment needed to realize practical application of these large sized batteries is high.

On the other hand, a problem which can occur when a large number of EVs and PHEVs have spread will be described below.

FIG. 2 is a diagram illustrating the simulation result of the charging power when charging 50 EVs that are used for the purpose of commuting is simulated for 3 days. This simulation was conducted under the condition in which each EV is plugged in immediately after a trip and charging is started.

As illustrated in FIG. 2, since a time zone when a trip is made in commuting is almost the same for the 50 cars, the time zone when charging is started with stop of movement is substantially equal for them. Thus, the charging power locally gathers in the concentrated time zone. From the standpoint of balance between supply and demand, power generation facilities that are required to satisfy large demand, which are steep and in which there is large fluctuation width are, in general, expensive. Also, where EVs for commuting gather locally as in a parking lot of a company, power distribution facilities which can be used for charging need to be prepared.

Moreover, a concept called smart grid has been recently proposed in which the balance between supply and demand balance can be stabilized by a collaborative arrangement among consumer devices, consumer power sources, and power systems (See Patent Literature 1, for example).

Furthermore, a technology to utilize EV batteries expected to be promoted for stable operation of power systems has been examined (See Non-Patent Literatures 1 and 2, for example).

In Non-Patent Literatures 1 and 2, a method in which not only a battery that mounted on an EV is charged by a power system but that is also discharged to the power system so as to suppress output fluctuation of a renewable power source has been proposed. This method is the ultimate method which can absorb supply-demand balance fluctuation in a short cycle such as several Hz. However, there is a cost problem since dedicated functions of charging/discharging need to be provided in each EV or another problem in which means for separating an EV from the power system without disrupting collaborative operation with a thermal power plan needs to be provided. Moreover, in view of the consideration that the main purpose of using a battery installed on an EV is to enable the vehicle to move (run), discharging energy from the power system, for the purpose of providing power to other objects, reduces the battery life of the charged battery, and is demerit for the owner of an EV.

Here, from the standpoint of the impact on the power system in which a charging operation is only needed to enable an EV or a PHEV to move, or from the standpoint of a battery for time shift of power demand so that it corresponds to the amount of surplus power, managing a charging schedule for a large number of EVs and PHEVs is expected to become indispensable.

On the other hand, the battery that is installed in an EV is means that enables an EV to move, which is the purpose of the EV, is different from a battery that is used for facilities that do not move, such as a heat pump or the like, which is typical for time shift of power demand when there is demand for power during the night at areas where the battery is not continuously connected to the power system and in which whether or not the battery is connected to the power system depends on the behavior of the EV owner which is not known. Thus it is difficult to apply a planning method or a scheduling method on the basis of stationary facilities.

As described above, in a system in which a large number of EVs are linked and charged, it is necessary to control charging of batteries mounted on each of the EVs in real time, taking into consideration that situations are in a state of constant change. In this regard, hardly any comprehensive consideration have been giving to proposing a practical system to reduce the load/risk for the EV owner (insufficient battery charge when the vehicle moves, accelerated battery energy loss in the EV) and to reduce calculation processing loads for optimal scheduling.

CITATION LIST

Patent Literature

Patent Literature 1: JP2010-512727A

Non Patent Literature

Non-Patent Literature 1: Ota et al., "Proposal of Smart Storage in Ubiquitous Power Network-Autonomous Distributed type Vehicle-to-Grid for Electric Vehicles", Journal of Institute of Electrical Engineers B, Vol. 130, NO. 11, pp. 989 to 994 (2010)

Non-Patent Literature 2: Ota et al., "Effect with respect to Frequency Control of Smart Storage in Ubiquitous Power Network", Journal of Institute of Electrical Engineers B, Vol. 131, NO. 1, pp. 94 to 100 (2011)

SUMMARY OF INVENTION

Technical Problem

The above-described technologies have a problem in which there is no system or method for controlling charging scheduling for a large number of vehicles (1) that meets a real-time adjustability (demand change) request for a power generation/demand plan, considering surplus power expected in advance; (2) on the condition that desired (full) charging is achieved at departure of all the EVs; and (3) that can be realized by limited calculation resources and capacity of a communication system and also, scalability for increase/decrease of the number of EVs is ensured.

An object of the present invention is to provide a charging control system that solves the above-described problems, a charging controller, and a charging control method.

Solution to Problem

A charging control system of the present invention is:

in a charging control system comprising a distribution device which distributes power, a plurality of interface devices, that are each connected to a battery mounted on a vehicle for charging the battery with the power distributed from distribution device, and a charging controller which controls charging in the interface device, the charging controller that is characterized by controlling charging to the battery by the interface device on the basis of distribution system connection time when the interface device and the battery are connected to each other and on the basis of distribution system disconnection time when they are disconnected in each of the plurality of interface devices.

Also, the charging controller of the present invention is a charging controller which controls charging in the plurality of interface devices, each connected to a battery mounted on a vehicle for charging the battery with the distributed power, the charging controller has a control portion which controls charging to the battery by the interface device on the basis of distribution system connection time when the interface device and the battery are connected to each other and based on distribution system disconnection time when they are disconnected in each of the plurality of interface devices.

Also, the charging control method of the present invention is:

a charging control method which controls charging in the plurality of interface devices, each connected to a battery mounted on a vehicle for charging the battery by using the distributed power, processing for charging the battery by using the plurality of interface devices, and processing for controlling charging to the battery by the interface device is executed on the basis of distribution system connection time when the interface device and the battery are connected to each other and on the basis of distribution system disconnection time when they are disconnected in each of the plurality of interface devices.

Advantageous Effects of Invention

As described above, in the present invention, the adjustability of the power system can be improved without depriving the owner of freedom with regard to shifting charge times.

BRIEF DESCRIPTION OF DRAWINGS

FIG. 12 is a diagram for explaining the principle of a second exemplary embodiment of the "look-ahead target correction method" applied in this scheduling system.

DESCRIPTION OF EMBODIMENTS

Exemplary embodiments of this embodiment will be described below by referring to the attached drawings.

Figure 3:
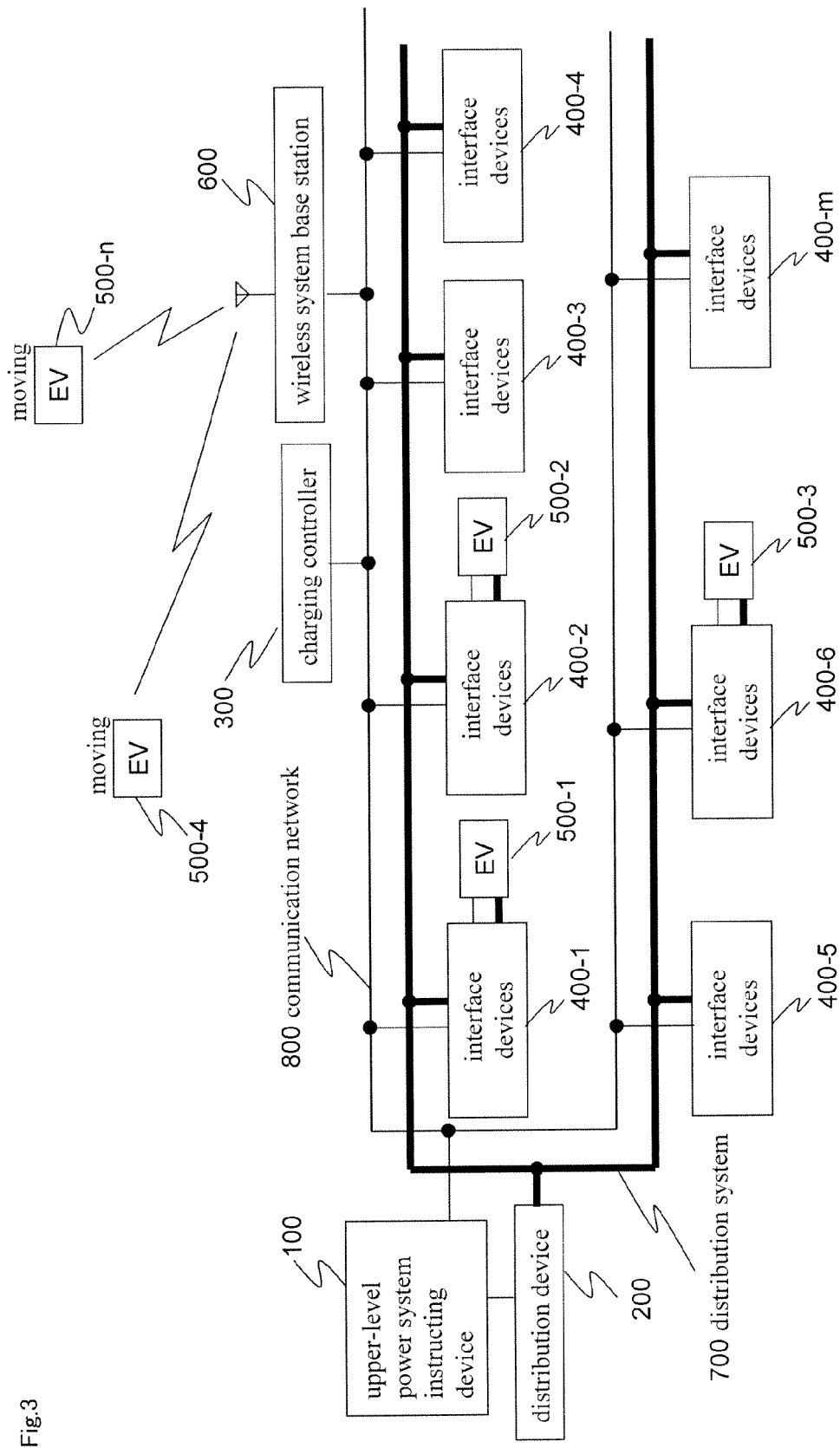
FIG. 3 is a diagram illustrating an exemplary embodiment of a charging control system of the present invention.

FIG. 3 is a diagram illustrating an exemplary embodiment in which a charging control system of the present invention is put into practice.

This exemplary embodiment includes, as illustrated in FIG. 3, upper-level power system instructing device 100, distribution device 200, charging controller 300, interface devices 400-1 to 400-m (m is an integer not less than 2), EV 500-1 to 500-n (n is an integer not less than 2), wireless system base station 600, distribution system 700, and communication network 800.

Upper-level power system instructing device 100 makes supply-demand plans and executes the charging scheduling. Moreover, upper-level power system instructing device 100 transmits a signal involved in control of the above-described plans and scheduling to interface devices 400-1 to 400-m via communication network 800. Moreover, upper-level power system instructing device 100 may be arranged in an electric power supply company.

Distribution device 200 distributes electric power. Specifically, distribution device 200 supplies power to interface devices 400-1 to 400-m via distribution system 700.

Charging controller 300 controls charging to a battery mounted on each of EVs 500-1 to 500-n (in FIG. 3, EV 500-1 to 500-3) connected to each of interface devices 400-1 to 400-m. In the following explanation, the description of "charging to EV 500-1 to 500-n" means "charging to the battery mounted on each of EVs 500-1 to 500-n". The same applies to the description of "connection to EV 500-1 to 500-n" and the like.

Figure 4:
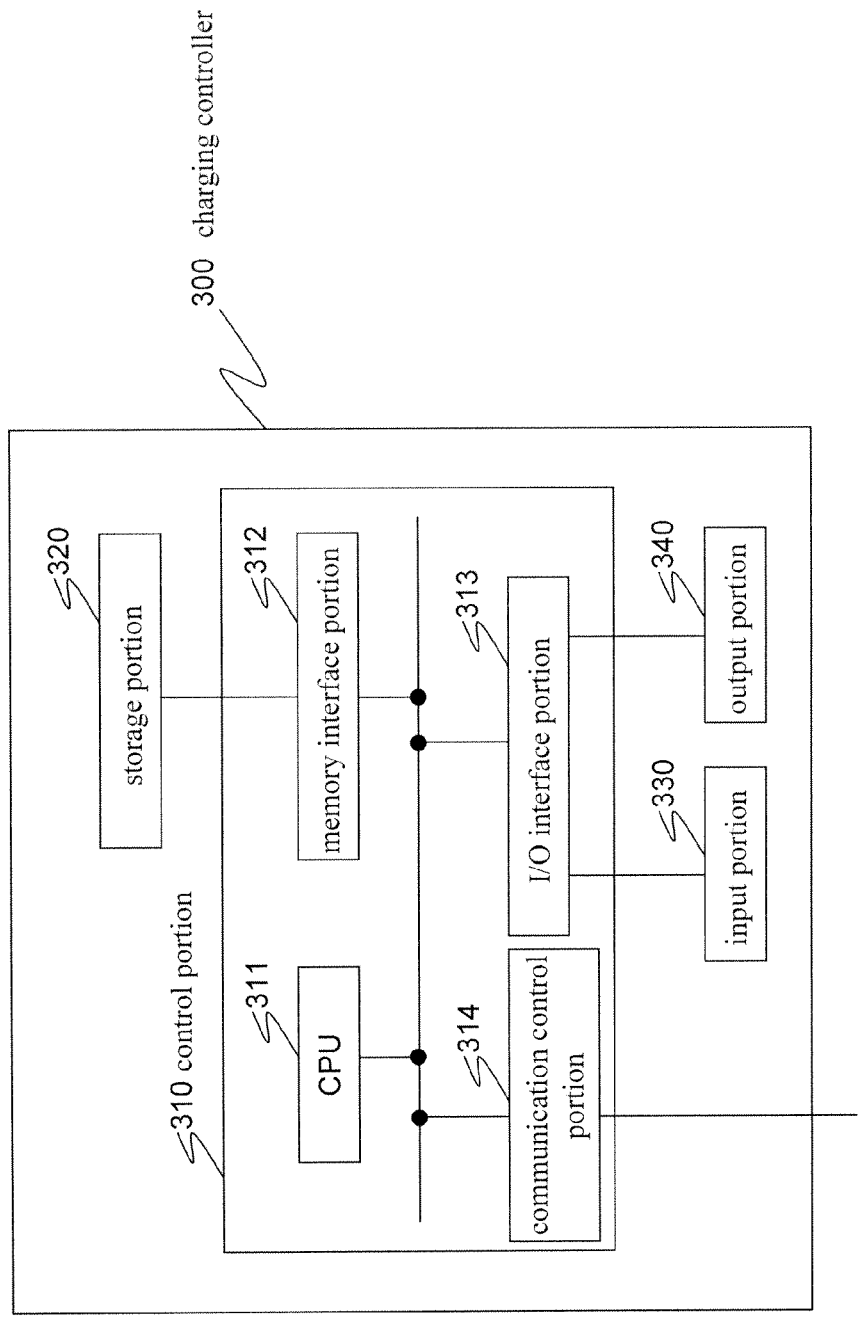
FIG. 4 is a diagram illustrating an example of the internal structure of a charging controller illustrated in FIG. 3.

FIG. 4 is a diagram illustrating an example of the internal structure of charging controller 300 illustrated in FIG. 3.

In charging controller 300 illustrated in FIG. 3, as illustrated in FIG. 4, control portion 310, storage portion 320, input portion 330, and output portion 340 are provided.

Control portion 310 controls charging to EVs 500-1 to 500-n connected to (plugged in) interface devices 400-1 to 400-m. Specifically, when the power supplied to interface devices 400-1 to 400-m from distribution device 200 via distribution system 700 is used to charge EVs 500-1 to 500-n connected to interface devices 400-1 to 400-m, control portion 310 obtains predetermined information from EVs 500-1 to 500-n, executes the charging scheduling on the basis of the information, and performs charging in accordance with this schedule. How to schedule will be described later.

Moreover, in control portion 310, as illustrated in FIG. 4, CPU 311, memory interface portion 312, and I/O interface portion 313, and communication control portion 314 are provided. Furthermore, they are connected by using a CPU bus.

CPU 311 executes the above-described scheduling.

Memory interface portion 312 has an interface function with storage portion 320.

I/O interface portion 313 has an interface function between input portion 330 and output portion 340.

Communication control portion 314 conducts communication with interface devices 400-1 to 400-m via communication network 800. At this time, if EVs 500-1 to 500-n are connected to interface devices 400-1 to 400-m, communication control portion 314 conducts communication with EVs 500-1 to 500-n via communication network 800 and interface devices 400-1 to 400-m.

Moreover, storage portion 320 includes a main storage device, a recording medium, and a data accumulating device.

The main storage device temporarily holds information required for processing by CPU 311. Also, the storage medium stores a program which makes CPU 311 execute processing of the present invention. Also, the data accumulating device accumulates information of EVs 500-1 to 500-n and information such as running pattern data of EVs 500-1 to 500-n for previous plan scheduling created on the basis of that data.

Input portion 330 inputs commands, information and the like to control portion 310.

Output portion 340 outputs the processing result of control portion 310.

Interface devices 400-1 to 400-m charges EVs 500-1 to 500-n connected to interface devices 400-1 to 400-m by using the power distributed from distribution device 200.

Figure 5:
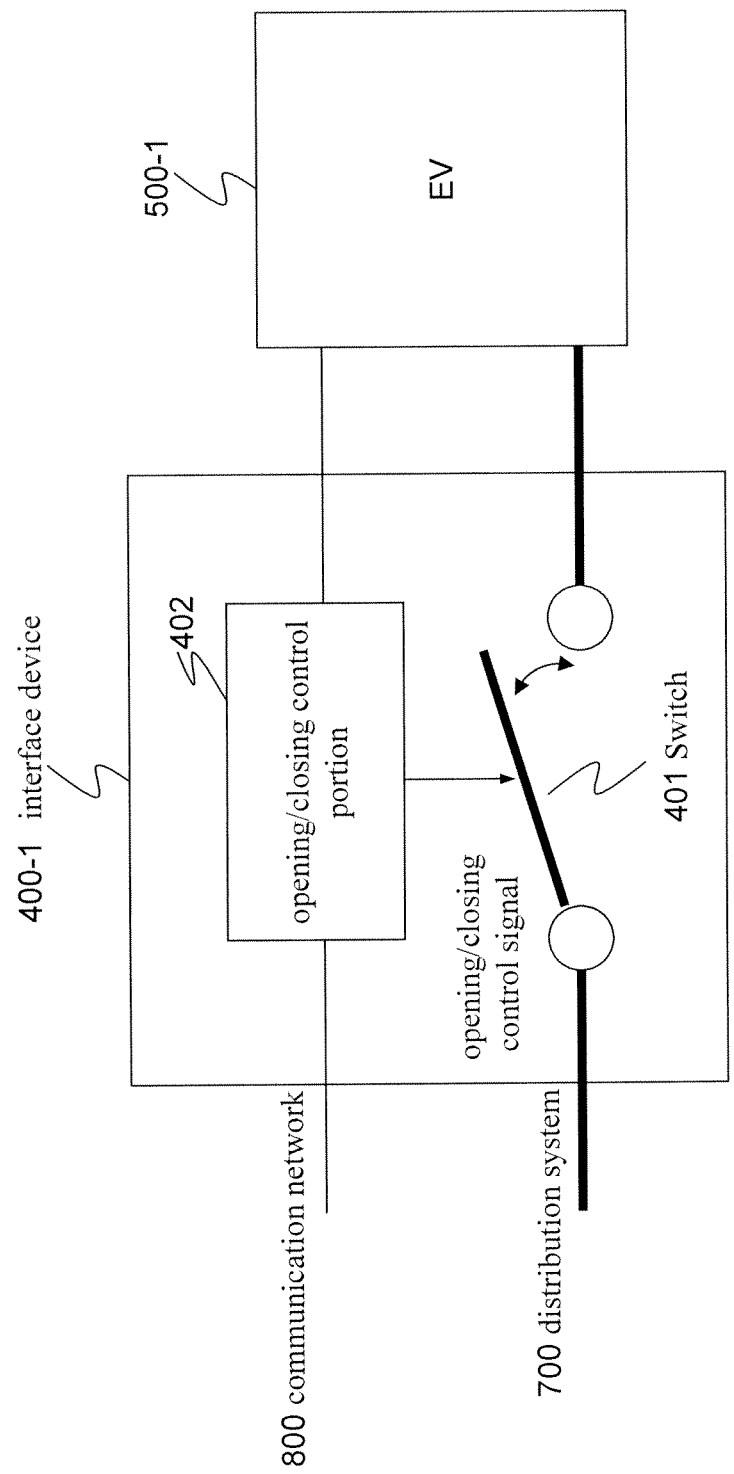
FIG. 5 is a diagram illustrating an example of the internal structure of an interface device illustrated in FIG. 3.

FIG. 5 is a diagram illustrating an example of the internal structure of interface device 400-1 illustrated in FIG. 3. The internal structures of interface devices 400-2 to 400-m illustrated in FIG. 3 are the same as those of interface device 400-1. Also, at present, EV 500-1 is connected to interface device 400-1.

In interface device 400-1 illustrated in FIG. 3, as illustrated in FIG. 5, switch 401 and opening/closing control portion 402 are provided.

Switch 401 has one end connected to distribution system 700 and the other end to EV 500-1 and is a switch which performs connection/disconnection on the basis of an opening/closing control signal outputted from opening/closing control portion 402. Moreover, switch 401 may be a DC power supply capable of varying the charging current and controllable instead of a simple opening/closing type if the battery interface of EV 500-1 is DC. In this case, the current value or a voltage value in a range which can be varied becomes the control amount instead of opening/closing.

Opening/closing control portion 402 is connected to communication network 800 and EV 500-1. Moreover, opening/closing control portion 402 obtains predetermined information from EV 500-1 when EV 500-1 is connected thereto and transmits the obtained information to charging controller 300 via communication network 800. Here, the predetermined information is information such as the state of charge (SOC) of the battery mounted on EV 500-1, the output voltage of the battery, the temperature of the battery and the like. Moreover, if the owner of EV 500-1 sets the distribution system connection time when EV 500-1 is connected to interface device 400-1 and sets the distribution system disconnection time when it is disconnected, the distribution system connection time and the distribution system disconnection time are also included in the predetermined information. Moreover, opening/closing control portion 402 opens/closes switch 401 by outputting an opening/closing control signal to switch 401 on the basis of the control signal for charging scheduling transmitted from charging controller 300 via communication network 800.

EVs 500-1 to 500-n are electric vehicles, on each of which the battery is mounted. EVs 500-1 to 500-n are charged by being connected to interface devices 400-1 to 400-m.

Wireless system base station 600 which is connected to communication network 800 and conducts wireless communication with EV while moving (EV 500-4 and 500-n in FIG. 3) is not connected to interface devices 400-1 to 400-m. In this wireless communication, wireless system base station 600 obtains the above-described predetermined information from EV (EV 500-4 and 500-n in FIG. 3) and transmits it to charging controller 300.

Distribution system 700 connects distribution device 200 to interface devices 400-1 to 400-m and supplies power from distribution device 200 to interface devices 400-1 to 400-m.

Communication network 800 is a communication path which connects upper-level power system instructing device 100, charging controller 300, interface devices 400-1 to 400-m, and wireless system base station 600 to each other for exchange of data and control signals among these devices. Communication network 800 may be configured by using radio or may be configured using cables. It is only necessary that communication network 800 be a communication line that operates with a communication speed and a response delay according to the length of a time unit of the charging scheduling and it does not necessarily have to be a super high speed and performance is determined by balancing the requirements amongst each of the components comprising the scheduling system.

Subsequently, processing executed by charging controller 300 will be described.

Figure 1:
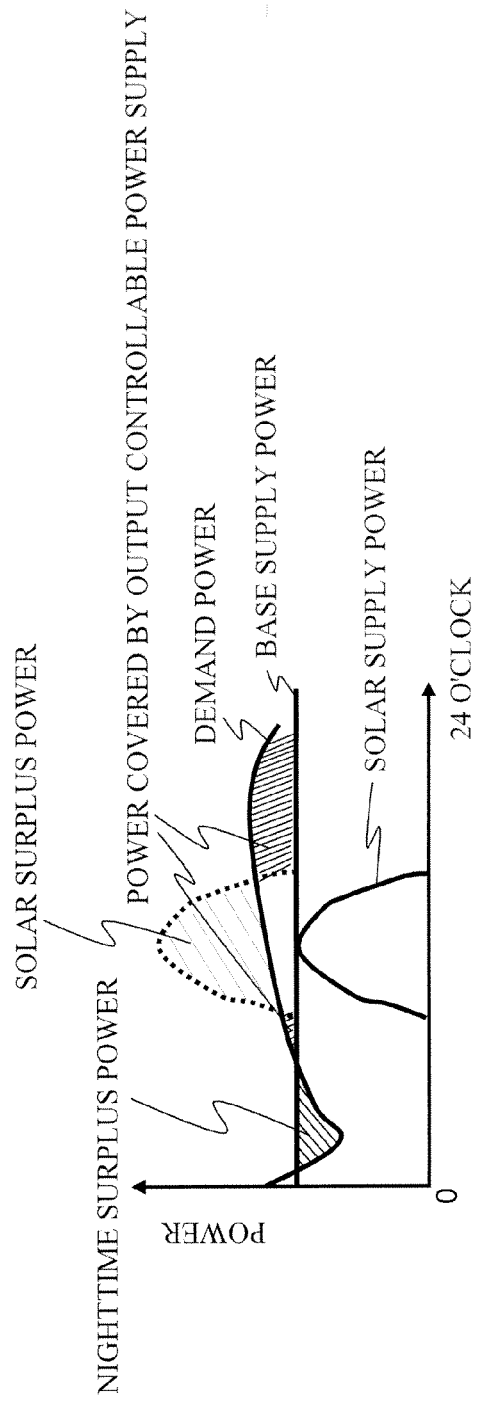
FIG. 1 is a diagram illustrating an example of a relationship between supply power and demand power in one day.
Figure 2:
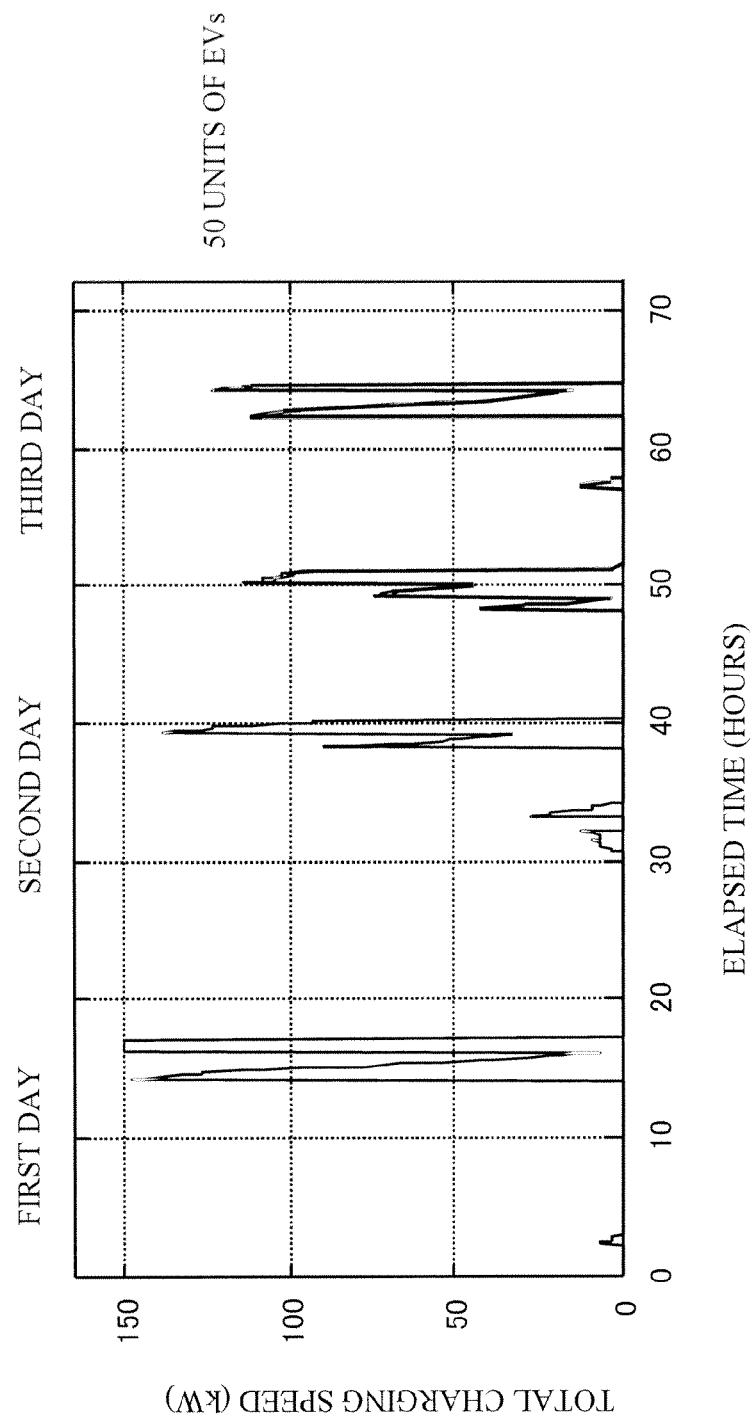
FIG. 2 is a diagram illustrating a simulation result of a charging power when charging of 50 EVs used for the purpose of commuting is simulated for 3 days.
Figure 6A:
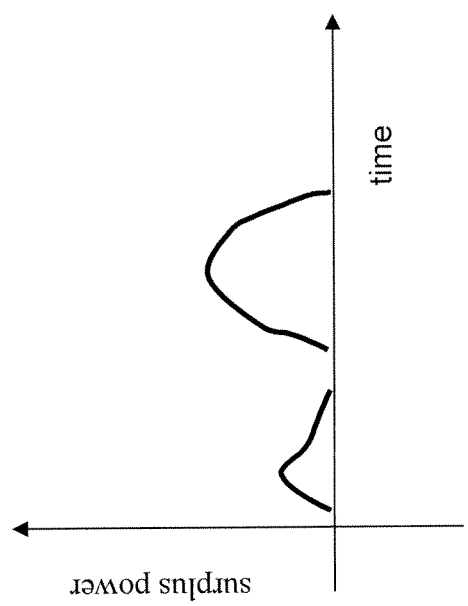
FIG. 6A is a diagram illustrating an example of a temporal change of surplus power explained by using FIG. 1.

FIG. 6A is a diagram illustrating an example of the temporal change in surplus power explained by using FIG. 1

Adjustment is made so that the surplus power (demand request) as illustrated in FIG. 6A is effectively used. In this case, adjustment to exactly conform to the demand request curve is not needed but charging may be arranged so that adjustability is sufficient, and rapid output fluctuation is not requested.

The total time-shift the amount of power that is available for charging EV does not necessarily become larger than power generated by solar light. Thus, in order to handle such a large scale phenomenon, not only charging time-shift of EV but other measures are also comprehensively executed in usual.

If the demand request curve is as illustrated in FIG. 6A, then the explanation becomes complicated, therefore, in the following explanation, a case in which the demand request has a monotonic increase, or a case in which a constant (flat) demand request is intended, is used as an example.

Figure 6B:
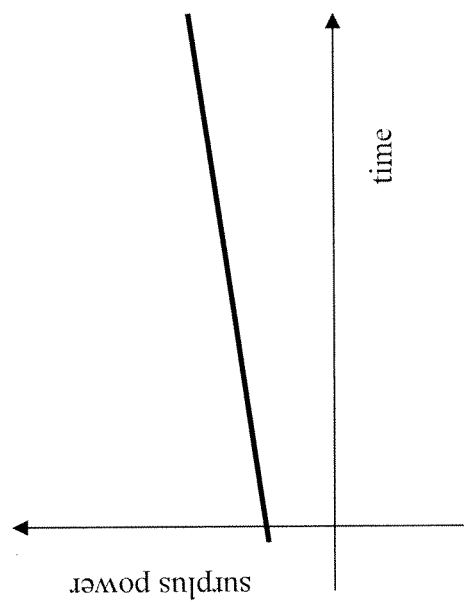
FIG. 6B is a diagram illustrating an example of a demand request with a monotonic increase to time.

FIG. 6B is a diagram illustrating an example of a demand request with the monotonic increase with time.

Figure 6C:
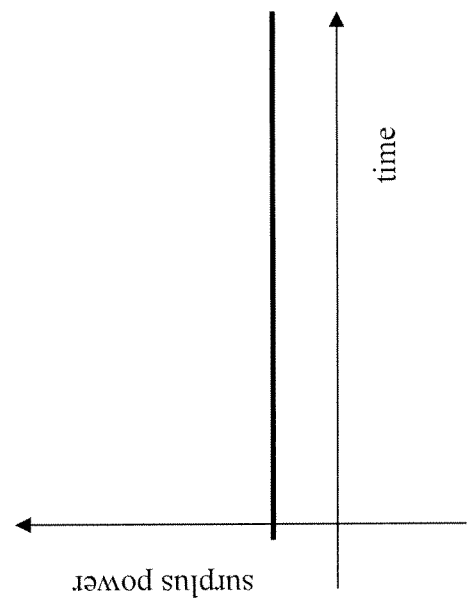
FIG. 6C is a diagram illustrating an example of a constant demand request vs. time.

FIG. 6C is a diagram illustrating an example of a constant demand request vs. time.

First, as described above as the premises, the requirements are:

(1) While the EV is stopped, the EV be connected to distribution system 700 (interface devices 400-1 to 400-m) all the time and charging is possible at any time during that period;

(2) At least in real time, charging controller 300 can obtain information of the time when the EV is stopped and connected to distribution system 700 (distribution system connection time), the time of next departure (distribution system disconnection time), and the charged amount (SOC) of the battery of the EV from the EV via interface devices 400-1 to 400-m and communication network 800; and (3) The charging control be executed only during the charging time, and the charged amount corresponding to the charging time can be associated for each EV by the function of SOC. Moreover, after the charging scheduling of this system is executed, the requirements are:

(4) The curve of the requested demand be traced; and (5) At the scheduled departure time of each EV, charging be completed to a predetermined SOC.

The distribution system connection time and distribution system disconnection time in the above-described condition (2) may be statistically estimated (calculated) on the basis of data accumulated in the past for each EV or can be realized by being set by the owner of the EV when the EV is stopped. In the following explanation, the distribution system connection and disconnection times are set by the owner of the EV, as an example.

Moreover, in the control in the above-described condition (3), for facilitation of explanation, it is assumed that the charging speed (charging power) does not depend on the SOC of the battery and is constant for all the EVs. For example, assuming that a battery of 18 kWh is to be fully charged from 0 kWh, if the charging power is set to 3 kW, the charging time is 6 hours. Determining to which time period this 6-hour charging time is allocated is the main subject of charging scheduling in this charging control system.

Figure 7:
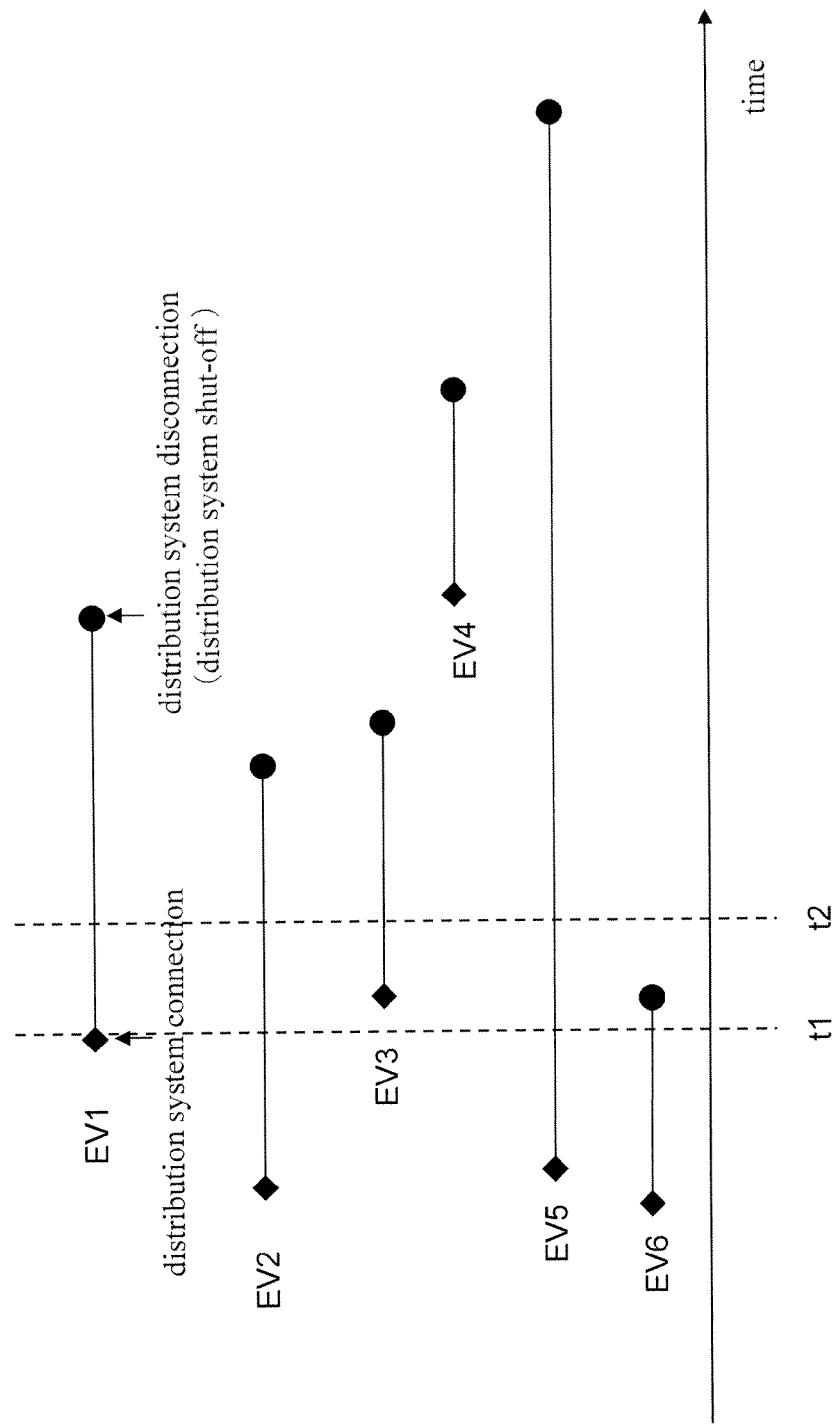
FIG. 7 is a diagram illustrating an example of a distribution system connection pattern of 6 EVs.

FIG. 7 is a diagram illustrating an example of distribution system connection patterns of 6 units of EVs 1 to 6.

As illustrated in FIG. 7, the time of distribution system connection (indicated by filled squares in the figure) and the time of distribution system disconnection (distribution system shut-off) (indicated by filled circles in the figure) are unique to each of EVs 1 to 6. These distribution system connection patterns can be considered as running patterns.

Such running data can be accumulated in the accumulating device in storage portion 320 in this system. For example, if average EV running patterns on weekdays can be statistically organized, the charging scheduling can be planned in advance by using the average running patterns. Here, for convenience of explanation, the explanation will be made on the premise that the running pattern is such.

Figure 8:
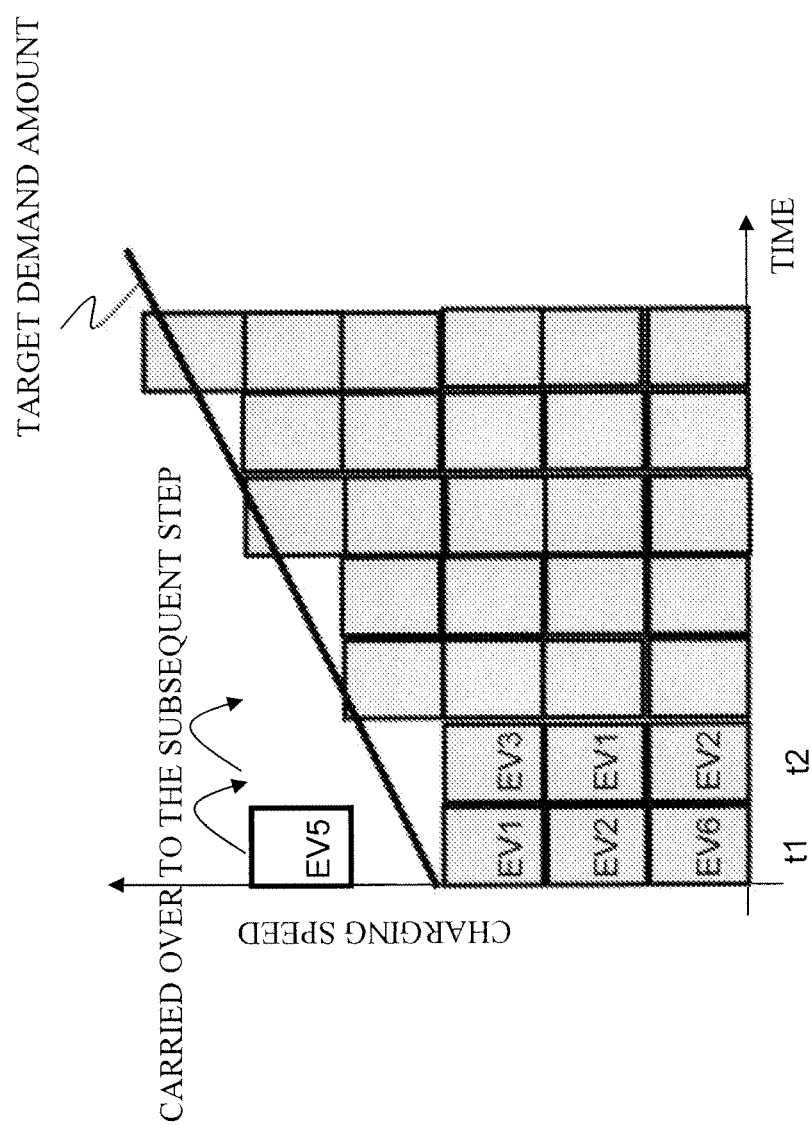
FIG. 8 is a diagram illustrating a method of charging scheduling executed in real time so as to follow a curve of request demand with the monotonic increase.

FIG. 8 is a diagram illustrating the method of a charging scheduling executed in real time so as to follow the curve of requested demand having a monotonic increase.

As illustrated in FIG. 8, in this method, a filling type algorithm (only the EV fitted above is charged) is used in which the target demand amount is divided into a grid shape by a unit time and unit charging power (EV charging power of one unit) and the charged amount is fitted to the target demand amount for each period (step).

Specifically, in this method, priority order of charging is given to each EV, and charging is carried out so as not to exceed the target demand amount set in advance in the order from the higher priority, and charging of the EV exceeding the target demand is carried over to the subsequent time (this will be referred to as "paving"). This priority order can be determined such that the smaller the SOC or the shorter the time from the current time to the distribution system disconnection time (connection remaining time), the higher is the priority rank given or the product of an inverse number of the SOC and the inverse number of the connection remaining time is used as a priority index for all the EVs connected to distribution system 700 at the current time.

For example, an example of a charging scheduling for EVs 1 to 6, assuming that time t1 in FIG. 7 is the current time will be described.

The EVs connected to distribution system 700 at t1 are EV1, EV2, EV5, and EV6. Assuming that the SOC are the same for all EVs, the priority order is determined from the shorter connection remaining time. That is, the priority order is determined as EV6, EV2, EV1, and EV5 from the highest.

In the case of scheduling for the target demand amount at time t1 illustrated in FIG. 8, by arranging EV6, EV2, and EV1 at time t1, the target demand amount is achieved. Thus, charging is applied to these 3 EVs, while charging to the remaining EV5 is carried over to the subsequent time.

At the subsequent time t2, EV3 is newly connected, and EV6 is disconnected (shut off). Since EV5 has a priority order lower than the newly connected EV3, it is carried over again, and the charging to EV2, EV1, and EV3 is executed at time t2.

As described above, even if EVs to be connected arrive and depart frequently, scheduling can be made only for charging at the current time by setting the priority order at the current time. From the viewpoints of a calculation amount and scalability, this method is considered to be effective.

A simulation result of the filling-type real-time scheduling according the above-described method made by using the running pattern of the EV created with random numbers for the flat demand request curve illustrated in FIG. 6C will be described. Here, the running data is divided into three groups of commuting, leisure, and business by application, for which the characteristics of the running pattern are varied, and the average running time and the average stoppage time are selected for each group so that they become close to the actual current EV running pattern, and variation in the EVs is created by giving random numbers. In this simulation, it is required that full charging be completed at the time when each EV is disconnected from distribution system 700. Thus, a scheduling procedure is set so that any EV that cannot achieve full charging after the above-illustrated filling scheduling is charged with priority regardless of the target. Therefore, all the EVs are fully charged by the time they depart.

Figure 9A:
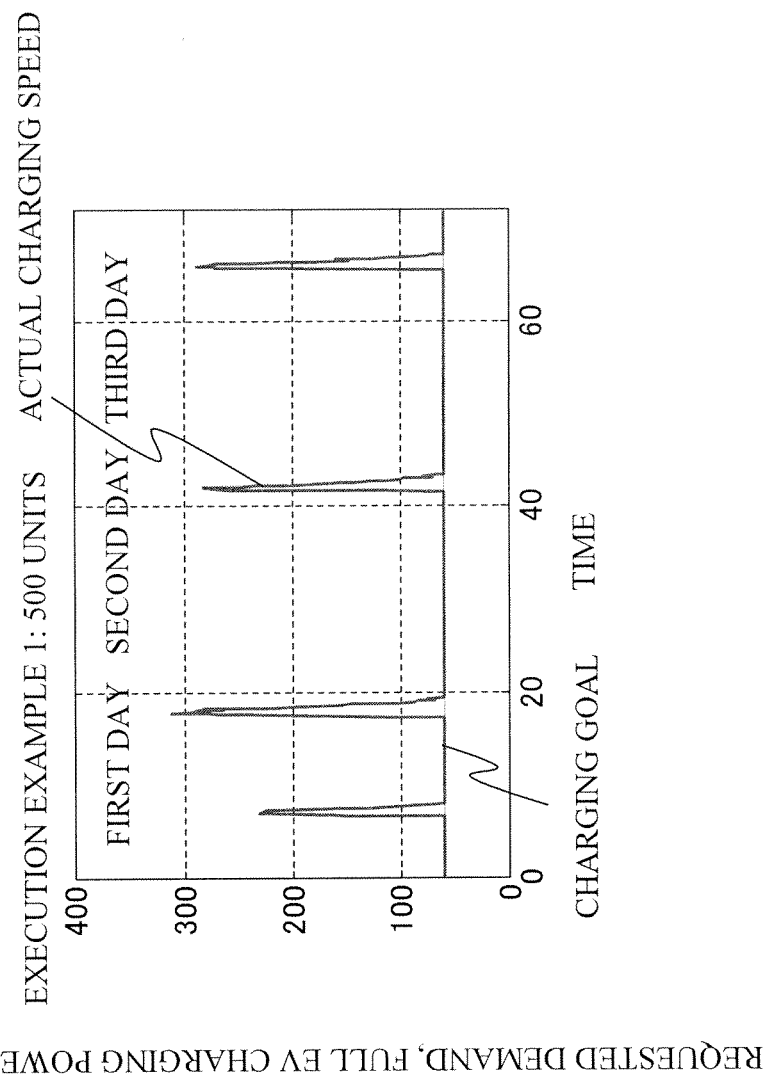
FIG. 9A is a diagram illustrating a simulation result if a low request demand target is set.

FIG. 9A is a diagram illustrating a simulation result if a low request demand target is set.

As illustrated in FIG. 9A, it is known that charging which steeply increases and decreases and exceeds the target in the shape of a horn is performed. The charging takes on the shape of a horn at this time since the group of EVs that are commuting are charged together. That is, charging could have been carried out at a time prior to this time, but the power amount of the request demand target is smaller than the amount of charge that is desired.

Figure 9B:
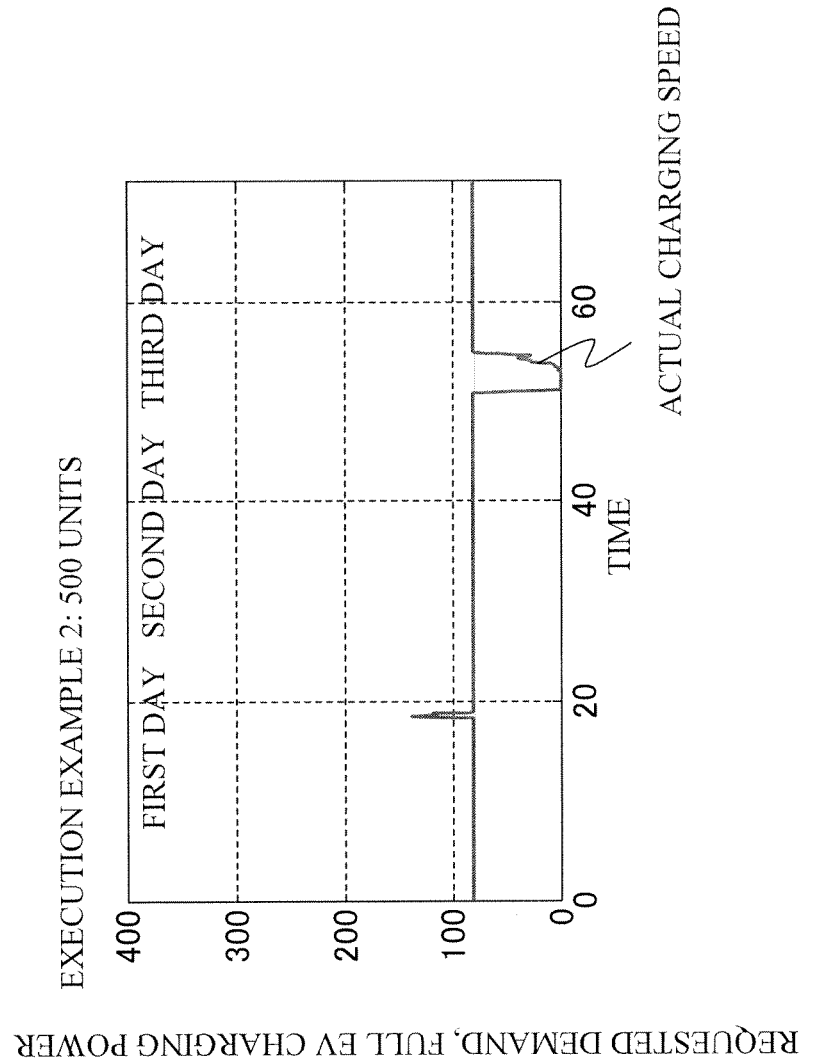
FIG. 9B is a diagram illustrating a simulation result if a high request demand target is set.

FIG. 9B is a diagram illustrating a simulation result if a high request demand target is set.

In this case, since the number of EVs that can be charged is not sufficient for achieving the target, the total charging power rapidly falls to 0 as a result. This is caused by the fact that the balance between the charging capable of time shift and the request demand substantially has broken. This might make execution of time shift of demand, which is the initial goal, impossible and cause nonconformity such as rapid demand fluctuation, which is beyond adjustability. This occurs because the amount of power that is needed to charge the EV is a parameter which specifies the traveling distance of the vehicle and the charging time-shift capable range and cannot be controlled during the period in which the EV is stopped. As described above, since freedom in shifting charging time for the EV is limited, a better scheduling method that takes into consideration the limited charging freedom is needed.

In order to suppress the time-shift of demand and rapid demand fluctuation, which are the initial goal, while simplicity of the above-described filling scheduling method is maintained, the nonconformity can be solved by using a "look-ahead target correction method" in which the request demand curve of the previous time is increased/decreased to some degree and supply and demand in time close thereto is well-balanced. By paying attention so that the request demand curve does not rapidly change, some increase/decrease in the demand curve does not matter for the purpose of maintaining a power system state with high adjustability, which is the initial goal.

Figure 10:
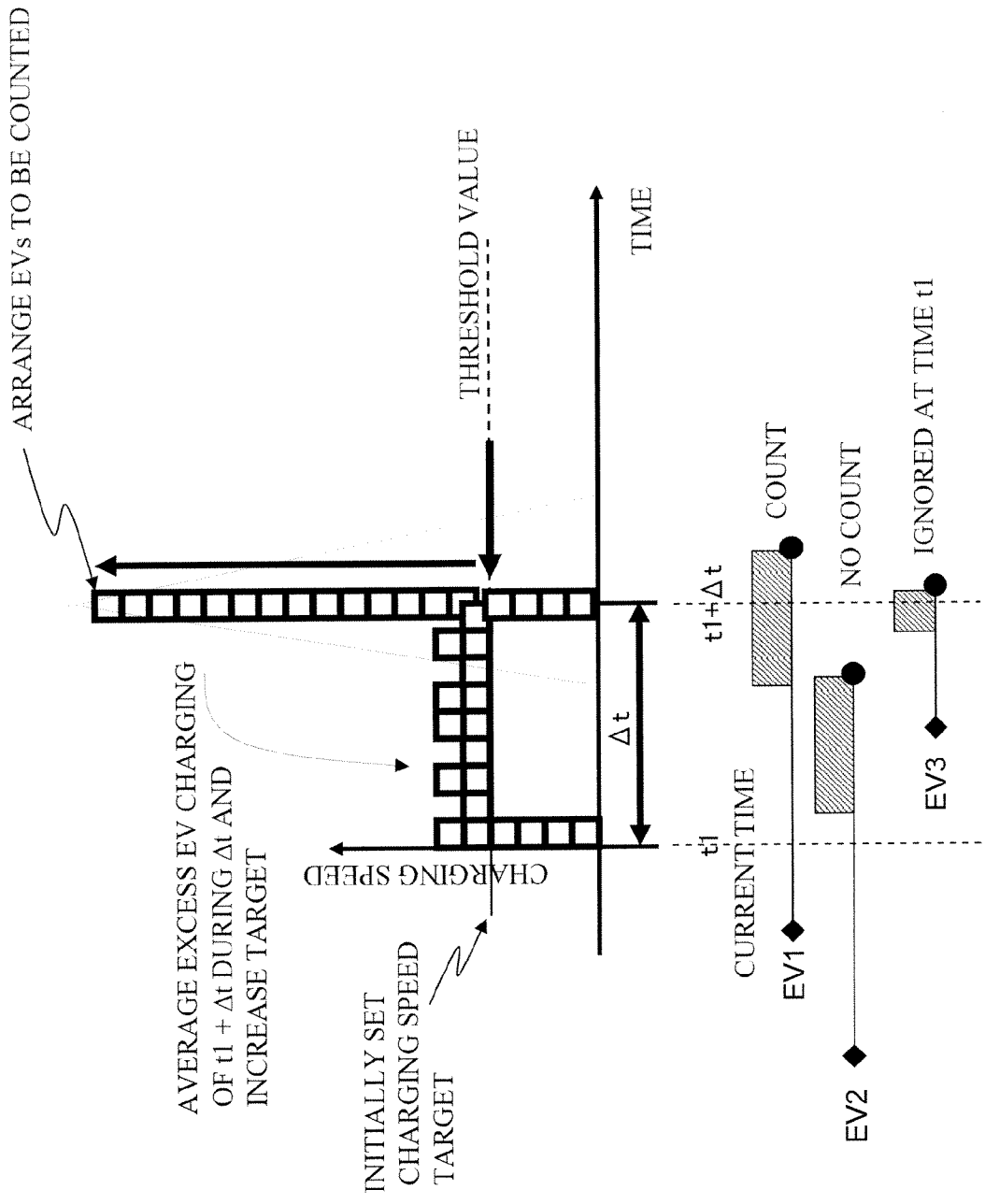
FIG. 10 is a diagram for explaining a first exemplary embodiment of a "look-ahead target correction method" applied in this scheduling system.

FIG. 10 is a diagram for explaining a first exemplary embodiment of the "look-ahead target correction method" applied to this scheduling system.

Here, it is assumed that the request demand target (total charging power of the request demand target) as an initial value is flat. First, for the current time t1 when filling is performed, the number of EVs which are likely to be charged at time ahead by $\Delta t$ is estimated. In this system, assuming that a charging schedule is made by setting the distribution system disconnection (distribution system shut-off) as the end time of full charging for each EV (EV1 and EV2 in FIG. 10) connected to distribution system 700 at time t1, the number of EVs being charged at the time ahead by $\Delta t$ is counted, and the total charging power of these EVs is found and set to an estimated total charging power at that time.

Here, the request demand target of $t=t1+\Delta t$ at that time is set to a threshold value and if the estimated total charging power exceeds the threshold value, the estimated total charging amount (the power amount per time count) at the time of $t=t1+\Delta t$ is averaged to the demand request target value between t1 to $t1+\Delta t$ and arranged for correction. As a method of setting a threshold value, an average value of the request demand target before change within the time of $\Delta t$ may be used. In changing (correction) by arranging of the request demand targets, a random number is used so as to avoid bias. As a result, the original request demand target value becomes slightly higher during the section from t1 to $t1+\Delta t$. By executing scheduling using $t=t1$ to the corrected demand request target, the EV is charged in real time.

The above processing is sequentially repeated in each time step. As a result, demand which will occur in the future is considered to have been averaged with the previous time and shifted in terms of time. By executing such processing, it is difficult for the request demand target to be exceeded.

If the stoppage time (connection time: period of time from distribution system connection time to distribution system disconnection time) is shorter than Δt as EV3 illustrated in FIG. 10, EV3 is not counted in the estimated total charging power and an error is made. Therefore, as a setting method of Δt, for example, it is preferable that Δt be set to a time shorter than the average stoppage time of all the EVs to be controlled. Then, the number of EVs that are not counted decreases, which is advantageous.

Moreover, a plurality of Δt may be set. For example, by setting two types of Δt, the "look-ahead target correction" method of the two types of Δt can be executed by combination in time or can be executed continuously at the same time so as to improve accuracy.

In this system, since the past running patterns of EVs to be controlled are stored, average value data of the stoppage time and the like can be obtained according to the running pattern. On the basis of this data, it may so configured that a plurality of types of running pattern groups with a large influence are selected, the average stoppage time of the running patterns are set to Δt, and the above plural types of "look-ahead target correction" methods are executed.

In the following, a result of scheduling using the procedure of the "look-ahead target correction" by creating running data of 500 EVs on a computer will be described similarly to the above-described simulation. Here, Δt for looking ahead is set to 6 hours.

Figure 11A:
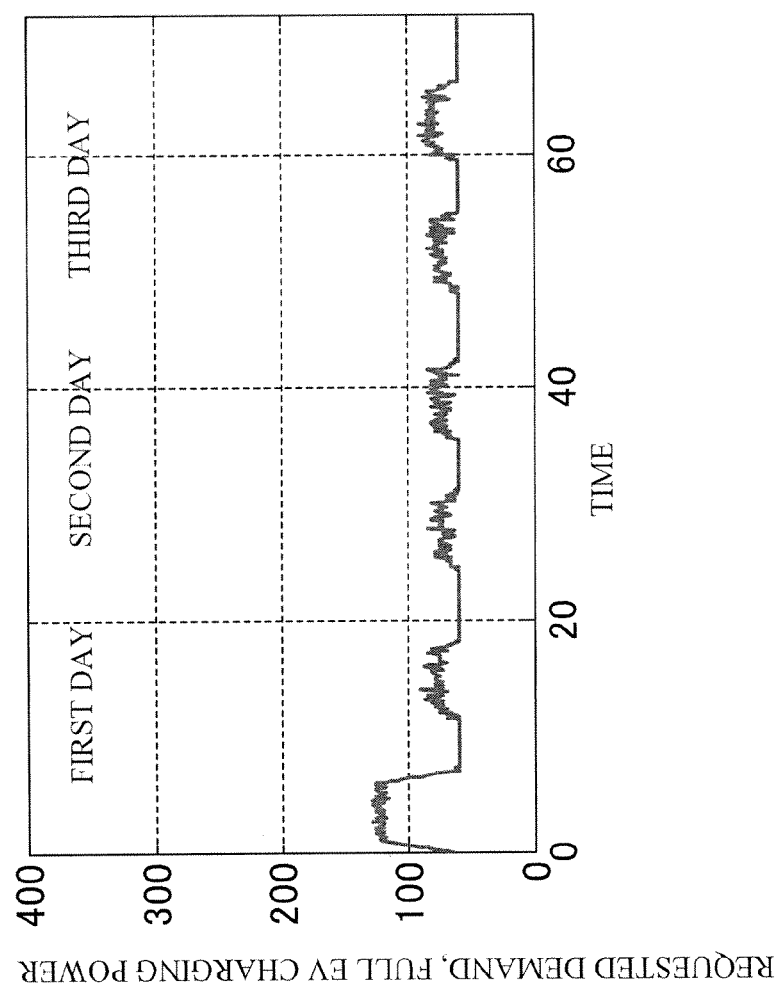
FIG. 11A is a diagram illustrating a result when the request demand target is set to 3 days and a constant value of 60 kW.

FIG. 11A is a diagram illustrating a result when the request demand target is set to 3 days and a constant value of 60 kW.

From the result illustrated in FIG. 11A, it is known that the charging which steeply exceeds the request demand target can be well removed as compared with the result illustrated in FIG. 9A. By correction of the request demand target, some irregularity occurs but there is no steep output change. Thus, the method can be applied to obtain adjustability achieved by time shift of demand. In the result illustrated in FIG. 11A, the correction amount of the request demand target in a time zone at the beginning of the first day is higher than the other time zones. This is caused by the effect of an edge where the scheduling is started, and attention would be paid only to the start of the scheduling. The influence of the edge becomes smaller by setting the time width Δt to look ahead to shorter time. Thus, it can be solved by setting Δt to shorter time at the start of the scheduling and by gradually increasing Δt, for example.

Subsequently, as an extreme example, in order to determine if it is possible to concentrate charging by a pulse state, charging scheduling in which charging is concentrated for 3 hours at 200 kW around the noon of the second day is tried.

Figure 11B:
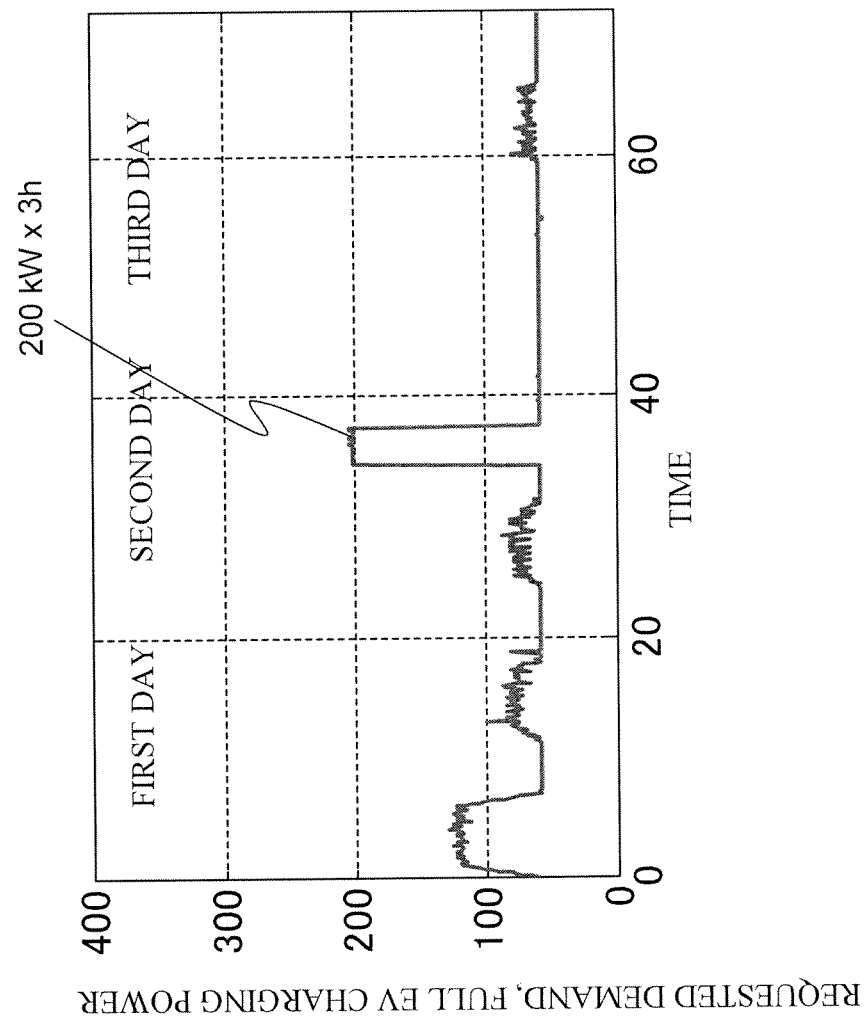
FIG. 11B is a diagram illustrating a result of charging scheduling such that charging is concentrated in 3 hours at 200 kW around the noon on the second day.

FIG. 11B is a diagram illustrating a result of the charging scheduling in which the charging is concentrated for 3 hours at 200 kW around the noon of the second day. In time zones other than around the noon on the second day, the request demand target is 50 kW.

As illustrated in FIG. 11B, it is known that a difference from the request demand target is not large over the entire region and special target demand requests are accommodated.

Subsequently, a second exemplary embodiment of the "look-ahead target correction method" applied in this scheduling system will be described.

FIG. 12 is a diagram for explaining the principle of the second exemplary embodiment of the "look-ahead target correction method" applied in this scheduling system.

In FIG. 12, the stoppage time zones (running patterns) of the EV stopped in a look-ahead target correction period from the current time until the time of Δt has elapsed are plotted.

In FIG. 12, a rectangular frame indicated in the stoppage time zone represents a required charging amount at the time when each EV is stopped while constant charging power is expressed as height. This frame is temporarily arranged so that the time of disconnection from the distribution system with respect to the running pattern becomes the final time. At this time, on the basis of the relationship between stop/start times of the EVs and the current time, in addition to, as well as on the basis of the temporary charging schedule being included in the target correction period, the charging electricity can be classified into $w_1$, $w_2$, $w_3$, and $w_4$ as illustrated in FIG. 12.

$w_1$ indicates the electricity energy that is needed to charge the EV connected at the current time within the target correction period. $w_2$ indicates the amount of power that may be used to charge the EV connected at the current time after the target correction period (charging within the target correction period is also possible). On the other hand, $w_3$ and $w_4$ indicate the amount of power used to charge EVs, corresponding to $w_1$ and $w_2$, not connected at the current time but stopped within the target correction period, respectively.

By defining that $W_T$ is the target total electricity energy within the target correction period, if the following relationship holds true:

$$W_1 + W_3 \leq W_T \leq W_1 + W_2 + W_3 + W_4 \quad \text{(formula 1)}$$

it can be determined that the original target does not have to be corrected. Here, $W_1$ indicates the total amount counted as $w_1$ for all the EVs, and the other $W_2$ to $W_4$ are also defined similarly.

Here, since $W_3$ and $W_4$ are not yet known at the current time, they need to be predicted by using some method. If the past running patters of the EVs under control are understood as the configuration of the charging system, it becomes possible to make a prediction by using a statistical method or the like.

Assume that $W_3$ and $W_4$ are obtained by prediction, if the following holds true:

$$W_1 + W_3 \geq W_T$$

a charging electricity energy ΔW portion for the insufficient charging electricity energy given as follows is assigned within the target correction period Δt:

$$\Delta W = W_1 + W_3 - W_T$$

Figure 13:
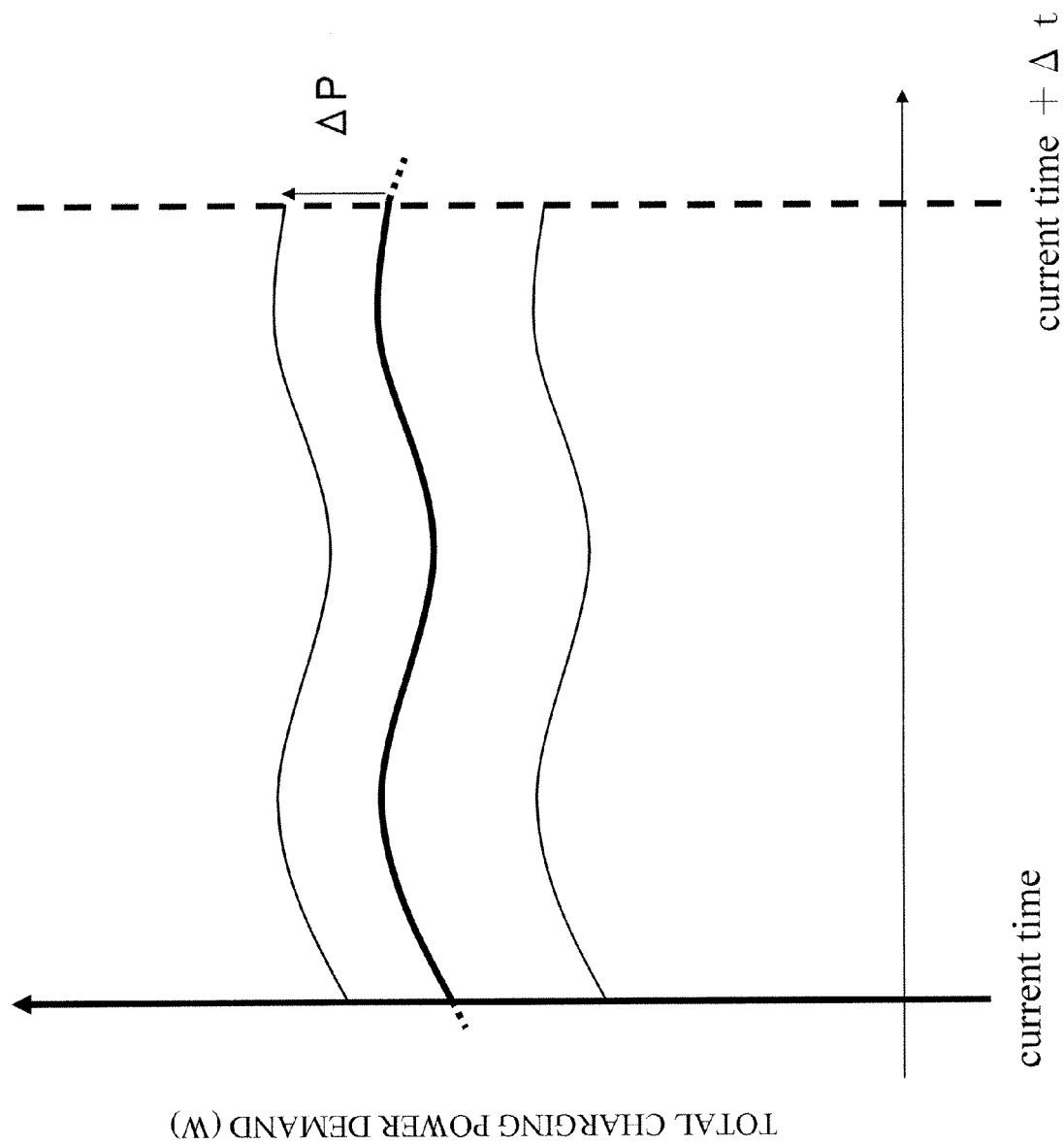
FIG. 13 is a diagram for explaining an example of a method of assigning an insufficient charging power amount $\Delta W$ within a target correction period $\Delta t$.

FIG. 13 is a diagram for explaining an example of a method of assigning an insufficient charging electricity energy ΔW portion within a target correction period Δt.

As illustrated in FIG. 13, as a method of assigning, ΔP=ΔW/Δt portion obtained by dividing ΔW by the target correction period Δt may be added to the target value during Δt and set as a new target or may be distributed by giving a weight to time.

On the other hand, if the following holds true:

$$W_T \geq W_1 + W_3 + W_4$$

the surplus charging electricity energy ΔW portion given as follows is assigned within the target correction time Δt:

$$\Delta W = W_T - (W_1 + W_3 + W_3 + W_4)$$

As a method of assignment, it seems preferable that the ΔP portion obtained by dividing ΔW by the target correction period Δt is subtracted from the target value during Δt and set as a new target, but distribution may be made by emphasizing time. As a result, correction which satisfies the (formula 1) can be made.

How the target correction functions by the above procedure will be described by using the simulation results.

Figure 14:
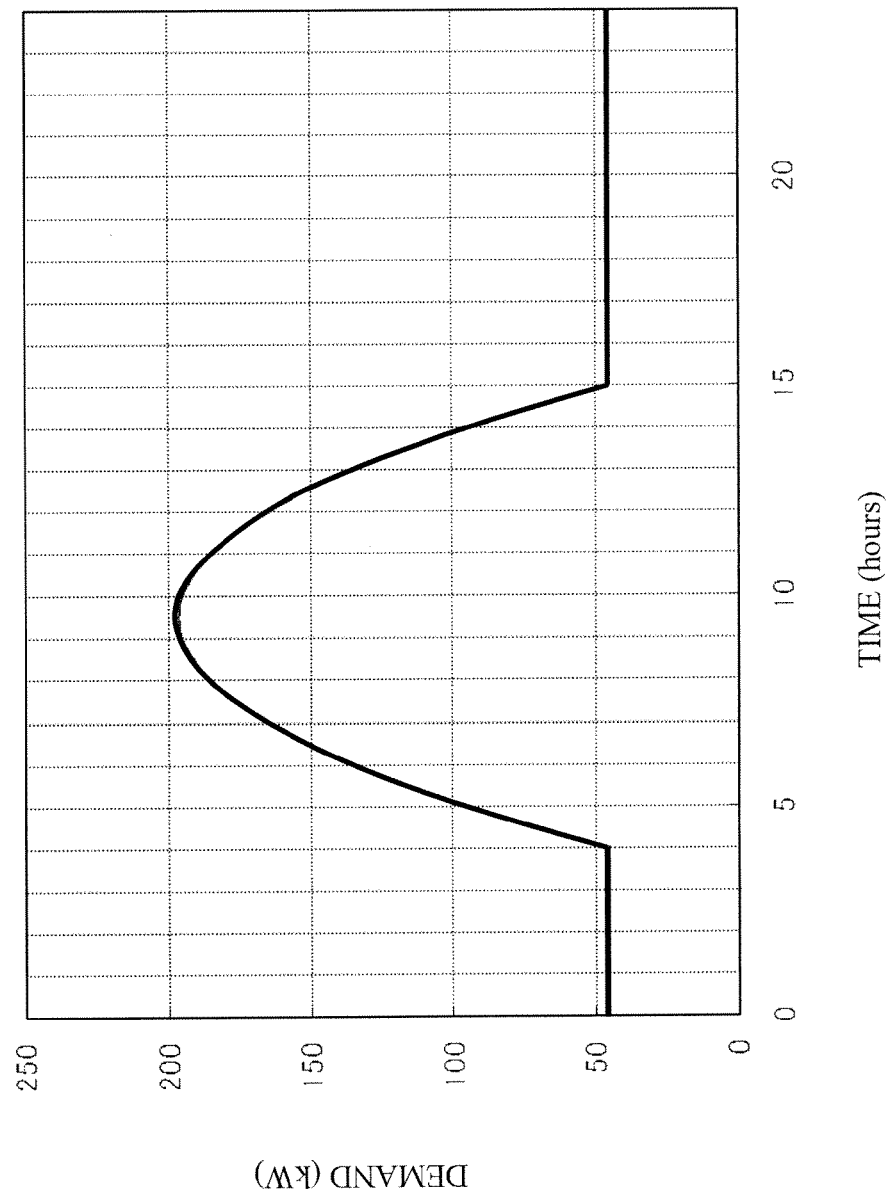
FIG. 14 is a diagram illustrating a demand target curve of total charging set in advance.

FIG. 14 is a diagram illustrating a demand target curve of the total charging set in advance.

As illustrated in FIG. 14, by assuming an output of photovoltaic power generation in which power is generated by using solar light, charging is concentrated in the daytime. As a result, equivalent demand can be made flat, and load of fluctuation control in a power generator to adjust power supply and demand can be alleviated.

In the simulation, the following conditions are set.

Assuming that $W_3$ and $W_4$ are in proportion with $W_1$ and $W_2$, which are similar in characteristics, respectively, they are indicated as $W3=\alpha W_1$, $W_3=\beta W_2$ ($\alpha$ and $\beta$ are proportional constant), and appropriate fixed values are set for $\alpha$ and $\beta$, respectively. These fixed values can be obtained by statistical data collected for the EVs and automobiles. Here, $\alpha$ used in the calculation is 0.7 and $\beta$ is 1. Moreover, the running pattern data of EV vehicles is created from random numbers in three types, that is, for commuting, for leisure, and for business. The ratio of them is set to for commuting:for leisure:for business=2:7:1. Moreover, $\Delta t$ is set to 5 hours. Furthermore, the total number of EV vehicles is set to 500.

Figure 15:
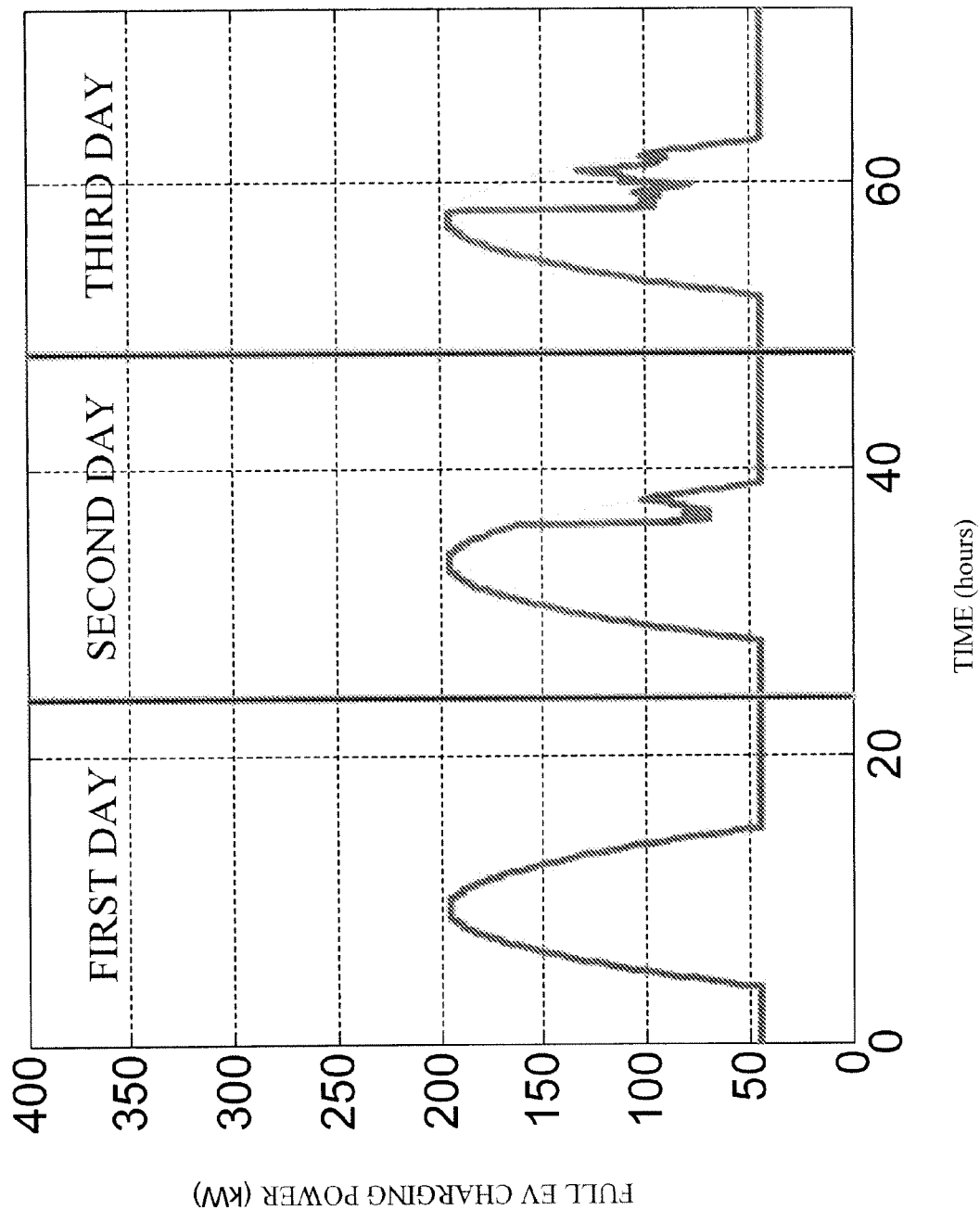
FIG. 15 is a graph illustrating a result of temporal change in total charging power in 3 days during which the second exemplary embodiment of the "look-ahead target correction method" under the above-described condition is not executed but filling scheduling is executed.

FIG. 15 is a graph illustrating a result of temporal change in the total charging power in 3 days during which the second exemplary embodiment of the "look-ahead target correction method" under the above-described condition is not executed but filling scheduling is executed.

As illustrated in FIG. 15, since the EV to charge runs out in the second day and the third day, a phenomenon of rapid drop in the charging power occurs. The scheduling is executed originally in order to alleviate fluctuation of the power generator for supply-demand balance but the phenomenon creates a bad influence and it needs to be avoided.

Figure 16:
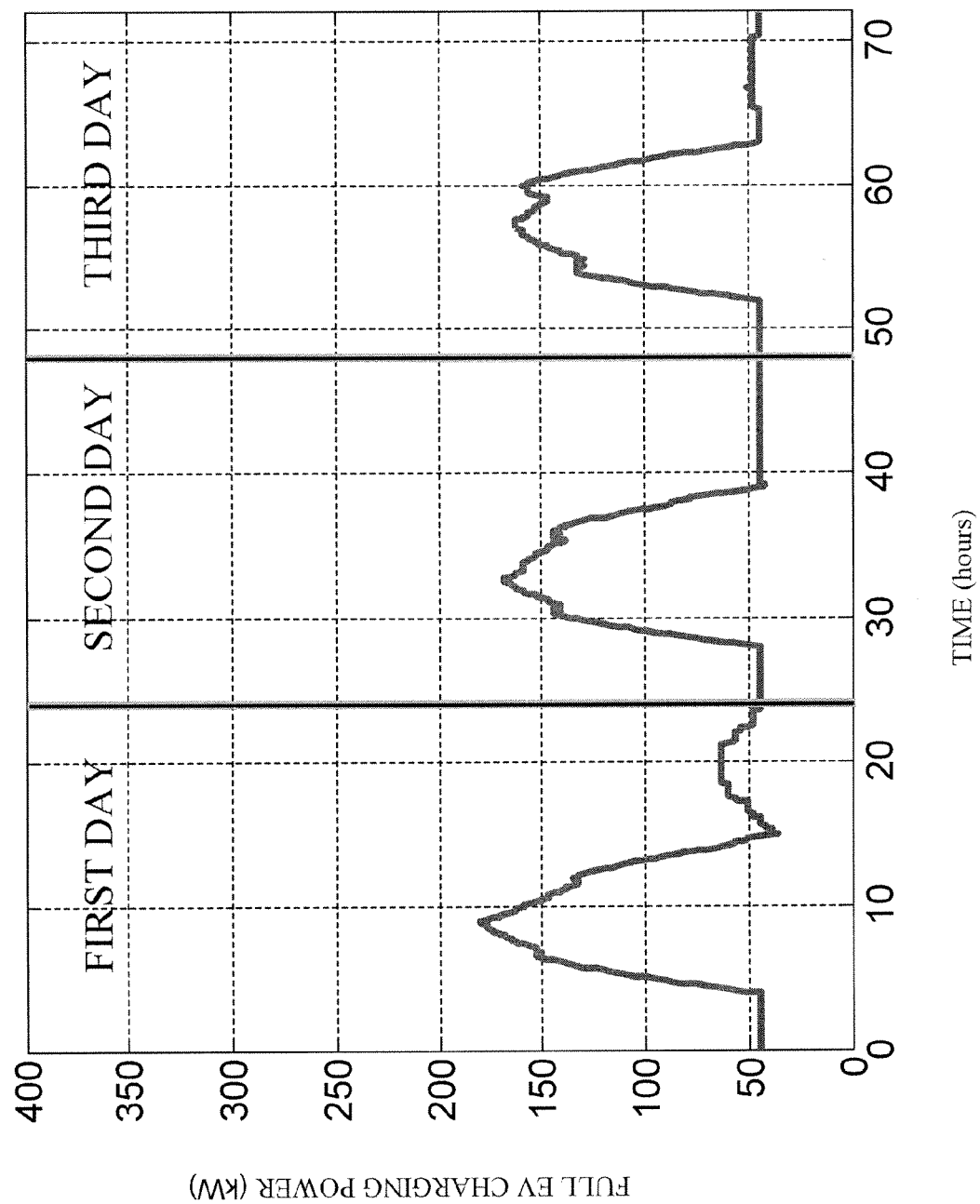
FIG. 16 is a graph illustrating a result of a temporal change total charging power in 3 days during which the second exemplary embodiment of the "look-ahead target correction method" under the above-described condition is executed and the paving scheduling is executed.

FIG. 16 is a graph illustrating a result of temporal change in total charging power in 3 days during which the second exemplary embodiment of the "look-ahead target correction method" under the above-described condition is executed and the filling scheduling is executed.

As illustrated in FIG. 16, the peak value is somewhat lower than the target set in advance in all the three days, but a rapid decrease can be avoided. Thus, the supply-demand balance is maintained without imposing a large burden on the output adjustment processing of the power generator and the request for full charging of the EV users can be satisfied.

The charging control system which executes the real time charging scheduling for the EV according to the present invention has been described. In order to control charging for a large number of EVs in real time, it needs to be recognized that there is no freedom with respect to charging for individual EVs to be fully charged or that there is an EV which suddenly departs from the control or the like. If the number of EVs to be controlled is large, even if there are some EVs which cannot be controlled, its influence on the adjustment capability of a large system can be ignored. Moreover, it is effective to execute the scheduling in advance before the real time charging scheduling and to combine it with means which determines the probability of a somewhat modified a request demand target. In this system, since the EV running data has been accumulated, a running pattern on the following day, for example, can be predicted by using the past information (statistical information). To create a charging plan on the basis of the information has sufficient time since it is performed in advance, which is a problem of optimization and can be solved by a generally-know solution.

As described above, by using the charging control system of the present invention, the adjustability of the power system can be improved without depriving the EV owner of freedom with respect to shifting the charging times. Moreover, by applying this charging control system to a large-sized parking lot, scheduling while distributing charging outputs can minimize the electric capacity of equipment required for the charging facilities. Furthermore, the electric utility rate that is quoted by an electric company on the day before charging the EV occurs, or on a real time basis, can be adjusted, and charging can be made with power at a lower rate. As described above, this charging control system can be applied to matters which have values based on the form (waveform) of target demand.

The EV has been used as a target in the above explanation, but the target may be an automobile basically using a battery as a power source and requiring charging of power from the distribution system by being plugged in (PHEV, for example) or the same effect can be realized even if the EV and PHEV are mixed and controlled.

Moreover, charging controller 300 corrects the target demand amount on the basis of the number of interface devices estimated to perform charging in time shorter than the average time from the distribution system connection time to the distribution system disconnection time in the plurality of interface devices 400-1 to 400-m.

The processing executed by each constituent element provided in the above-described charging controller 300 may be executed by a logical circuit fabricated in accordance with the purpose, respectively. Moreover, a computer program which describes the processing contents as a procedure (hereinafter referred to as a program) may be recorded in a recording medium readable by charging controller 300, and the program recorded in this recording medium may be read and executed by charging controller 300. The recording mediums readable by charging controller 300 refer to memories, HDD and the like including storage portion 320, ROM, RAM and the like built in charging controller 300 in addition to recording medium capable of transportation such as a floppy (registered trademark) disk, a magneto-optical disk, DVD, CD and the like. The program recorded in these recording mediums are read by control portion 310 provided in charging controller 300, and processing similar to those described above is executed in accordance with the control of control portion 310. Here, control portion 310 operates as a computer which executes the program read from the recording medium which records the program.

The invention of this application has been described by referring to the exemplary embodiments but the invention of this application is not limited by the above-described exemplary embodiments. The configuration and details of the invention of this application are capable of various changes which could be understood by those skilled in the art as being within the scope of the invention of this application.

This application claims the priority to Japanese Patent Application No. 2011-047761 filed on Mar. 4, 2011 and Japanese Patent Application No. 2011-174892 filed on Aug. 10, 2011 and the disclosure of which is hereby incorporated in its entirety.

The invention claimed is:
1. A charging control system, comprising:
a distribution device that distributes power;
a plurality of interface devices, each connected to a battery mounted on a vehicle for charging the battery with the power distributed from the distribution device; and a charging controller that controls charging in said interface device, wherein said charging controller controls charging to said battery by said interface device on a basis of a distribution system connection time when said interface device and said battery are connected to each other and on a basis of a distribution system disconnection time when said interface device and said battery are disconnected in each of said plurality of interface devices, wherein said charging controller controls the charging in compliance with a priority order of said plurality of interface devices so that a target demand amount set in advance is not exceeded, and wherein said charging controller:
calculates an amount of excess or insufficient power needed to charge a battery on a basis of electricity energy that is obtained by adding the electricity energy needed to charge a battery by said interface device, which is performing charging at a present time, to the electricity energy needed to charge a battery by said interface device, which is estimated to be carrying out charging of a battery after an elapse of a predetermined time; and
corrects the target demand amount on a basis of the calculated amount of excess or deficient power.

2. The charging control system according to claim 1, wherein
said charging controller gives priority to the charging by the interface device connected to the battery in which a period of time for charging the battery from a current time to the distribution system disconnection time is short.

3. The charging control system according to claim 1, wherein
said charging controller gives priority to the charging by the interface device connected to the battery whose amount of charge is small.

4. The charging control system according to claim 1, wherein
said charging controller corrects the target demand amount on a basis of a number of said interface devices that have been allocated to carry out charging at a predetermined later time.

5. The charging control system according to claim 1, wherein
said charging controller obtains the distribution system connection time and the distribution system disconnection time set in advance for said vehicle from the vehicle through said interface device when said interface device and said battery are connected to each other and controls the charging on the basis of the distribution system connection time and the distribution system disconnection time thus obtained.

6. The charging control system according to claim 1, wherein
said charging controller controls the charging on the basis of the distribution system connection time and the distribution system disconnection time calculated on a basis of past statistics.

7. The charging control system according to claim 1, wherein said charging controller gives priority to the charging by the interface device connected to the battery with a least amount of charge.

8. The charging control system according to claim 1, wherein said charging controller gives priority to the charging by the interface device connected to the battery with a least amount of time for charging the battery from a current time to the distribution system disconnection time.

9. The charging control system according to claim 1, wherein said distribution system connection time and said distribution system disconnection time are unique for each interface device.

10. A charging controller that controls charging in a plurality of interface devices, each connected to a battery mounted on a vehicle for charging the battery by using distributed power, said charging controller comprising:
a control portion that controls charging of said battery by said interface device on a basis of a distribution system connection time when the interface device and said battery are connected to each other and on a basis of a distribution system disconnection time when said interface device and said battery are disconnected in each of said plurality of interface devices, wherein said charging controller controls the charging in compliance with a priority order of said plurality of interface devices so that a target demand amount set in advance is not exceeded, and wherein said charging controller:
calculates an amount of excess or insufficient power needed to charge a battery on a basis of electricity energy that is obtained by adding the electricity energy needed to charge a battery by said interface device, which is performing charging at a present time, to the electricity energy needed to charge a battery by said interface device, which is estimated to be carrying out charging of a battery after an elapse of a predetermined time; and
corrects the target demand amount on a basis of the calculated amount of excess or deficient power.

11. A charging control method that controls charging in a plurality of interface devices, each connected to a battery mounted on a vehicle for charging the battery by using distributed power, said method comprising:
charging said battery by using said plurality of interface devices; and
controlling the charging of said battery by said interface devices on a basis of a distribution system connection time when the interface device and said battery are connected to each other and on a basis of a distribution system disconnection time when said interface device and said battery are disconnected in each of said plurality of interface devices;
controlling the charging in compliance with a priority order of said plurality of interface devices so that a target demand amount set in advance is not exceeded;
calculating an amount of excess or insufficient power needed to charge a battery on a basis of electricity energy that is obtained by adding the electricity energy needed to charge a battery by said interface device, which is performing charging at a present time, to the electricity energy needed to charge a battery by said interface device, which is estimated to be carrying out charging of a battery after an elapse of a predetermined time; and
correcting the target demand amount on a basis of the calculated amount of excess or deficient power.

* * * * *

UNITED STATES PATENT AND TRADEMARK OFFICE
CERTIFICATE OF CORRECTION

PATENT NO.         : 8,963,493 B2
APPLICATION NO.    : 13/393816
DATED              : February 24, 2015
INVENTOR(S)        : Hitoshi Yano et al.

It is certified that error appears in the above-identified patent and that said Letters Patent is hereby corrected as shown below:

Title Page (73) Assignee should read: NEC Corporation, Tokyo (JP)
The University of Tokyo, Tokyo (JP)

Signed and Sealed this
Second Day of February, 2016

Michelle K. Lee
*Director of the United States Patent and Trademark Office*